May 15, 1934.　　　C. E. HOLLEY　　　1,958,754
TREATMENT OF COPPER AND OTHER METALS
Filed Feb. 23, 1932
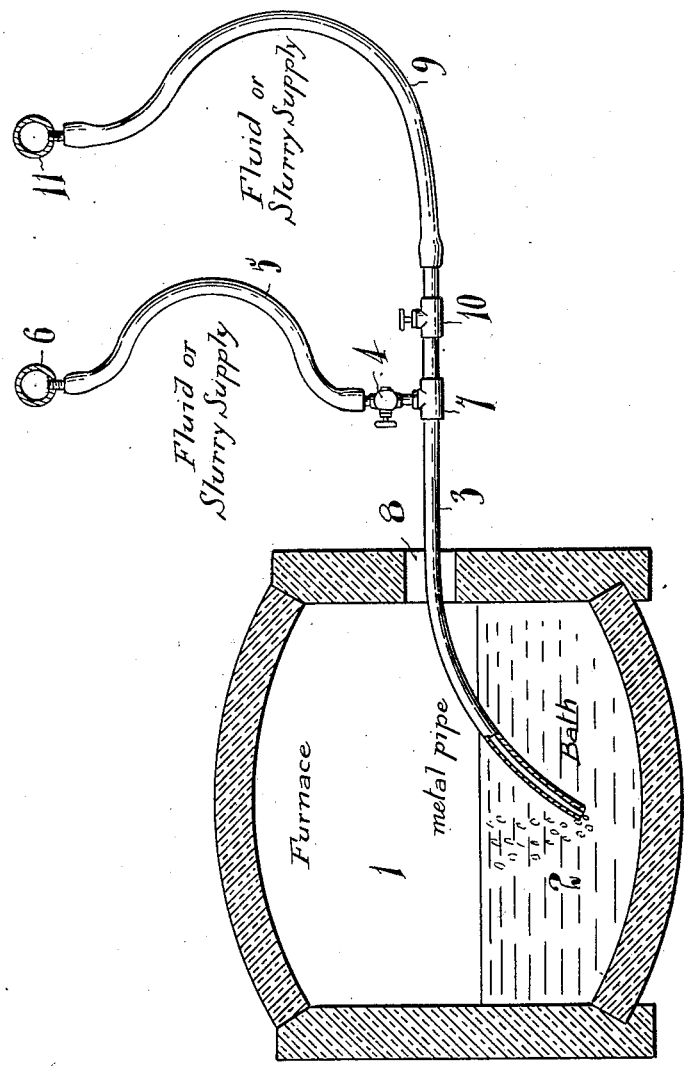
Inventor
C. E. Holley
By J. Edw. Maybee
ATTY.

Patented May 15, 1934

1,958,754

UNITED STATES PATENT OFFICE 1,958,754

TREATMENT OF COPPER AND OTHER METALS

Carlos E. Holley, Sudbury, Ontario, Canada

Application February 23, 1932, Serial No. 594,747

11 Claims. (Cl. 75—17)

This invention relates to an improved method of treating or refining copper or other metals and though it is described particularly as applied to the treatment of copper it will be understood that, with modifications which would suggest themselves to a metallurgist, many of the features of the process as described are equally applicable to the treatment of other metals.

In the refining of copper the usual procedure is to melt the copper in its impure state in a reverberatory furnace and then hold it there under heat for the refining process which is carried on as follows: The slag is skimmed off so as to expose the surface of the metal to the action of the furnace gases. During this period the furnace is supplied with an excess of air making the furnace gases of a strongly oxidizing character. Pipes are then immersed in the bath of molten metal and air is blown through them to agitate the bath and to introduce air in it. This agitation exposes fresh surfaces to the oxidizing atmosphere and the air blown in the bath reacts with it to help with the oxidation. This oxidation of the bath is for the removal of the sulphur, iron and other impurities some of which are carried away by the slag and some pass off as gases. Some of the distadvantages of this method are as follows: The pipes become overheated and burn thereby absorbing oxygen from the air passing through them. This reduces the amount of oxygen available for the bath, slows up the process and quickly destroys the pipes. In order to reduce this as much as possible high air pressure is used and a large quantity of air is blown through the pipes. This excessive quantity of air causes severe agitation and throws the molten metal on the arch and walls of the furnace causing rapid destruction of the brick work. About twenty years ago steam was used for this purpose in the Michigan Copper District but it was discontinued because of the difficulty of handling and because of the danger of scalding the men handling the pipes.

In order to entirely remove the impurities in the bath it is necessary to over oxidize the copper and at the end of the oxidizing period it carries up to 9% $Cu_2O$. This copper oxide is harmful and has to be removed. At times the copper also carries other impurities such as arsenic, antimony and other metals some of which are removed at this time. The usual method of removing the arsenic is to blow soda ash into the bath through pipes with air pressure or throw the soda ash on top of the bath. The arsenic combines with the soda ash and is skimmed off with the soda slag. This method is very wasteful of the soda ash and the slag formed is very destructive to the furnace lining.

After the arsenic and other metals have been removed the bath has to be deoxidized and brought to the proper pitch for casting into the final shapes. The usual method of doing this is to close up all possible openings in the furnace and reduce the amount of air admitted with the fuel so as to produce a neutral or reducing atmosphere in the furnace. Charcoal, coke or coal is then shoveled on the bath to protect it from any oxygen that may enter the furnace. Green hardwood poles are then immersed in the bath of molten copper. The heat of the copper distills the wood and water to form gases that agitate the copper and reduce the oxides carried by it Some of the gases are absorbed by the bath and give the copper the proper set for casting. The disadvantages of this method are as follows: 1st. The action is slow. 2nd. Only part of the wood is usefully employed for, when the pole gets too short to immerse properly, the balance is thrown into the furnace as a brand to float on top of the charge and has very little effect. 3rd. The amount of gas evolved is excessive and causes excessive agitation of the copper which is thrown on the walls and arch of the furnace and causes rapid destruction of the brickwork. 4th. The cost of poles is excessive and is getting higher.

In refining copper by my improved method the copper is melted in the usual manner. The furnace is then opened up to admit additional air and produce an oxidizing atmosphere. The bath of molten copper is then agitated in one of the two ways to be described. 1st method. Pipes are immersed in the bath in the upper ends of which a small stream or spray of water is being introduced. The water evaporates and in doing so absorbs heat thereby preserving the pipes. The steam generated passes out of the lower end of the pipes and rises through the bath and agitates it. This being done in the presence of an oxidizing atmosphere causes oxidation of the bath. 2nd method. Pipes are immersed in the bath in the upper ends of which a fine stream or spray of water is being admitted together with a stream of air under pressure. The water keeps the pipes cool by evaporation. The air and the steam formed by the water escape from the lower end of the pipes and rise through the bath. This agitates it and the air passing through the bath helps oxidize it. The advantages of this method are that the cooling of the pipes by the water preserves them, and that the cooled pipes do not consume the oxygen from the air passing through them, thus leaving more to act on the bath.

It is necessary to avoid the plugging of the tubes with the copper to have the steam passing from the ends of the tubes before the latter are immersed in the bath.

At some period during the refining the arsenic and other injurious elements have to be removed, if there are any in the bath. This can be done in several ways. First method. Pipes are immersed in the bath in the upper ends of which a small stream or spray of water or other liquid in which a chemical reagent or flux, such as soda ash, in solution or suspension, is being injected. The water or other liquid is vaporized and the vapor is discharged through the bottom end of the pipes and carries the reagent or flux with it. The vapor and flux rise through the bath and agitate it while the flux unites with the arsenic or other metal impurities and forms a slag which is skimmed off. Second method. Pipes are immersed in the bath in the upper ends of which water is being admitted in a small stream or spray together with a hydrocarbon or a ground or pulverized carbonaceous material in suspension in a liquid together with a chemical compound which acts as a catalyzing agent such as an alkali or lime. Steam is sometimes substituted for the stream of water mentioned. The steam formed by the water or separately admitted reacts with the carbon present to form hydrogen, carbon monoxide and carbon dioxide and other gases. The hydrogen unites with the arsenic antimony, sulphur or other impurities to form hydrides such as $AsH_3$, $SbH_3$ and other gases such as $H_2S$ which are carried off by the waste gases. The advantages gained by the above methods are better control of the fluxes added, better contact and mixing of the fluxes and the bath, making less loss of materials and cheapening the operation by the reduction in the amount of flux neded and reduction in furnace repairs.

The bath now carries considerable copper oxide which is removed as follows: The bath is covered with charcoal, coke or other carbonaceous material. All possible openings in the furnace are closed. The air entering the furnace is regulated so as to give a neutral or slightly reducing atmosphere. Pipes are immersed in the bath in the upper ends of which any of the following combinations of materials are being admitted or injected.

*Combination one.*—Inject a small stream or spray of water and a small stream or spray of oil or a small stream or spray of a mixture or emulsion of water and oil or other hydrocarbon into the upper end of the pipes. The water is converted into steam by the heat of the pipes and of the bath of metal. The steam reacts with the carbon in the hydrocarbon to form hydrogen, carbon monoxide and carbon dioxide and other gases are freed from the hydrocarbons. $H_2O+C=CO+2H$ or $2H_2O+C=CO_2+4H$. The relative proportions of the gases can be varied by varying the relative proportions of carbon and water which assists in regulating the set of the finished product. The gases pass out of the lower end of the pipes and pass up through the bath. This agitates the bath and the gases react on the oxides and reduce them. The hydrogen reacts with any sulphur in the bath or in the materials fed into the bath to form $H_2S$ which is carried off with the waste gases. The advantages gained by poling up this method in place of immersing green poles in the bath are, better control of the reaction, reduction in cost of the materials, reduction in the time required, reduction in damage done to the furnace and a saving in repair costs.

*Combination two.*—Inject a jet of steam and a small stream or spray of oil or other hydrocarbon into the upper end of the pipes with the same reactions and advantages mentioned above.

*Combination three.*—Inject a slurry or mixture of pulverized charcoal, pulverized coal or other carbonaceous material in suspension in water into the upper end of the pipes. The water is converted into steam and reacts on the carbon and gives the same reactions and benefits mentioned above.

*Combination four.*—Inject a jet of steam and a small stream or jet or pulverized charcoal, pulverized coal or other carbonaceous material in suspension in water, oil or other liquid or combination of liquids into the upper end of the pipes. The steam will react with the carbon and form gases that will react the same as and have the same advantages as mentioned above.

After the oxides have been removed from the bath and it has absorbed sufficient gas to give it the proper set it is cast in the usual manner.

In the poling method mentioned above the oil, hydrocarbons or carbonaceous material do not necessarily enter the bath. They react with the water in the hot pipes to form hydrogen and other gases which react on the oxides and sulphur.

The apparatus for carrying out the process is illustrated diagrammatically in the accompanying drawing in which 1 represents the furnace and 2 the bath of molten metal. An opening 8 is formed in one side which, when necessary, may be closed in any suitable manner. 6 is a main supply pipe through which a liquid or slurry of a solid and liquid is supplied as required. This pipe 6 is connected by a flexible pipe 5 with the open ended metal pipe 3 which is adapted to be pushed through the opening 8 and immersed in the bath 2. A valve 4 provides means for controlling the flow. To provide means for supplying a second fluid reagent, the connection 7 between the flexible pipe 5 and the pipe 3 is formed as a T to which both the flexible pipe 5 and a second flexible pipe 9 are connected. A valve 10 controls flow through the pipe 9 and the latter is connected to the supply pipe 11.

In agitating the bath with water water at a suitable pressure is supplied to the pipe 6, but the valve 4 is at first closed.

The pipe 3 is then inserted into the furnace until it becomes heated. The valve 4 is then partly opened to admit water to the pipe 3. As soon as steam issues from the end of the pipe 3 it is immersed in the bath. The valve 4 may then be adjusted to pass the right quantity of water to give the desired agitation and to keep the temperature of the pipe sufficiently low.

When both water and air are employed, the air may be supplied through the pipe 9 to mix with the water from the pipe 5 and the valves 4 and 10 adjusted to give any desired agitation of the bath and cooling of the pipe 3.

When a slurry of liquid and powdered solid or solids is to be fed to the pipe 3 it may be supplied from the pipe 6 and, if necessary, any other fluid supplied from the pipe 11. With this apparatus all the steps of the process hereinbefore described may be carried out.

The general principle of this invention is to introduce any of the previously mentioned substances or mixtures into tubes or pipes immersed in a bath of molten copper or other metal. The tubes or pipes become heated through contact with the heated metal and through contact with the hot gases over the metal and the heat is transmitted to the materials passing through them. The heat vaporizes the liquids and in some cases disintegrates them causing them to react to form new chemical compounds and elements which react on the bath of molten metal. The evaporation and disintegration absorb heat which cools the tubes or pipes and helps to preserve them from the intense heat of the furnace. The resulting gases are forced into the bath and cause agitation and in some cases they react with the bath and cause chemical reactions.

What I claim as my invention is:

1. The method of introducing a pulverulent flux into a metallurgical bath which consists in feeding it in a suspended form by means of water injected into the outer ends of open metal pipes immersed in and contacting with the contents of the bath, whereby the water is vaporized in and cools the pipes, and the resulting steam carries the flux into the bath.

2. The method of introducing a solid reagent into a metallurgical bath which consists in the feeding of a solid reagent in pulverulent form into the bath by means of water injected into the outer ends of open metal pipes immersed in and contacting with the contents of the bath, whereby the water is vaporized in and cools the pipes, and the resulting steam carries the reagent into the bath.

3. A process of treating copper and the like which consists in injecting water below the surface of a bath of the molten metal, whereby the water is vaporized and the resulting steam rises through the bath and agitates its contents; bringing air into contact with the agitated material to oxidize sulphur; thereafter injecting, as aforesaid, water associated with a flux to slag off arsenic; and lastly deoxidizing the bath by injecting as aforesaid, water associated with a reagent capable of reaction therewith to form free hydrogen which passes up through the bath.

4. A process of treating copper and the like which consists in injecting water below the surface of a bath of the molten metal, whereby the water is vaporized and the resulting steam rises through the bath and agitates its contents; bringing air into contact with the agitated material to oxidize sulphur; thereafter injecting, as aforesaid, water associated with a flux to slag off arsenic; and lastly deoxidizing the bath by injecting, as aforesaid, water associated with a carbonaceous material capable of reaction therewith to form free hydrogen which passes from the point of injection and up through the bath.

5. A process of treating copper and the like which consists in injecting water below the surface of a bath of the molten metal, whereby the water is vaporized and the resulting steam rises through the bath and agitates its contents; bringing air into contact with the agitated material to oxidize sulphur; and thereafter injecting, as aforesaid, water associated with a flux to slag off arsenic.

6. A process of treating copper and the like which consists in aerating and agitating a bath of the molten metal; thereafter injecting into pipes immersed in the bath water associated with a flux to slag off arsenic.

7. A process of treating copper and the like which consists in aerating and agitating a bath of the molten metal; thereafter injecting into pipes immersed in the bath water, together with carbonaceous material and a catalyzing agent whereby hydrogen is formed which combines with arsenic or antimony present to form hydrides of these metals.

8. In a process of treating copper and the like the steps which consist in injecting through an open pipe immersed in a bath of molten metal, a slurry containing pulverized carbonaceous material and a catalyzing agent suspended in a liquid together with steam whereby the liquid conveys the carbonaceous material and the catalyzing agent into the pipe and the steam reacts on the carbon to form free hydrogen which rises through the bath and combines with the sulphur, arsenic, antimony and oxygen present.

9. In a process of treating copper and the like, the steps which consist in injecting through an open pipe immersed in a bath of molten metal, a slurry comprising pulverized carbonaceous material in association with oil and steam whereby the liquid conveys the carbonaceous material into the pipe and the steam reacts on the carbon to form free hydrogen which issues from the end of the pipe, rises through the bath and reduces it.

10. In a process of treating copper and the like in a furnace the steps which consist in closing up the furnace and melting the metal to oxidize iron and sulphur; opening up the furnace and producing an oxidizing atmosphere, injecting water through pipes immersed in the bath to agitate the bath and bring the molten metal in contact with the oxidizing atmosphere to oxidize the iron, lastly closing the furnace and producing a neutral atmosphere and introducing water associated with carbonaceous material through pipes immersed in the bath whereby free hydrogen is produced which passing from the ends of the pipes rises through the bath and reduces it and gives the copper the proper set for casting; and at some stage prior to the last step injecting, through pipes immersed in the bath, water in association with a carbonaceous material and a catalyzing agent whereby free hydrogen is generated, which passes out through the bottom of the pipes into the bath where it reacts on any sulphur, oxygen and arsenic present.

11. A process of treating copper and the like which consists in injecting into the outer ends of pipes immersed in a bath of molten metal, a slurry consisting of pulverized carbonaceous material and a catalyzing agent suspended in water, whereby the water evaporates and cools the pipes and the resulting steam reacts with the carbon present to form free hydrogen which issues from the ends of the pipes, and combines with the arsenic, sulphur, antimony and oxygen present.

CARLOS E. HOLLEY.